Nov. 8, 1927.
H. GRIFFIN
ANIMAL TRAP
Filed Feb. 26, 1927
1,648,765
2 Sheets-Sheet 1
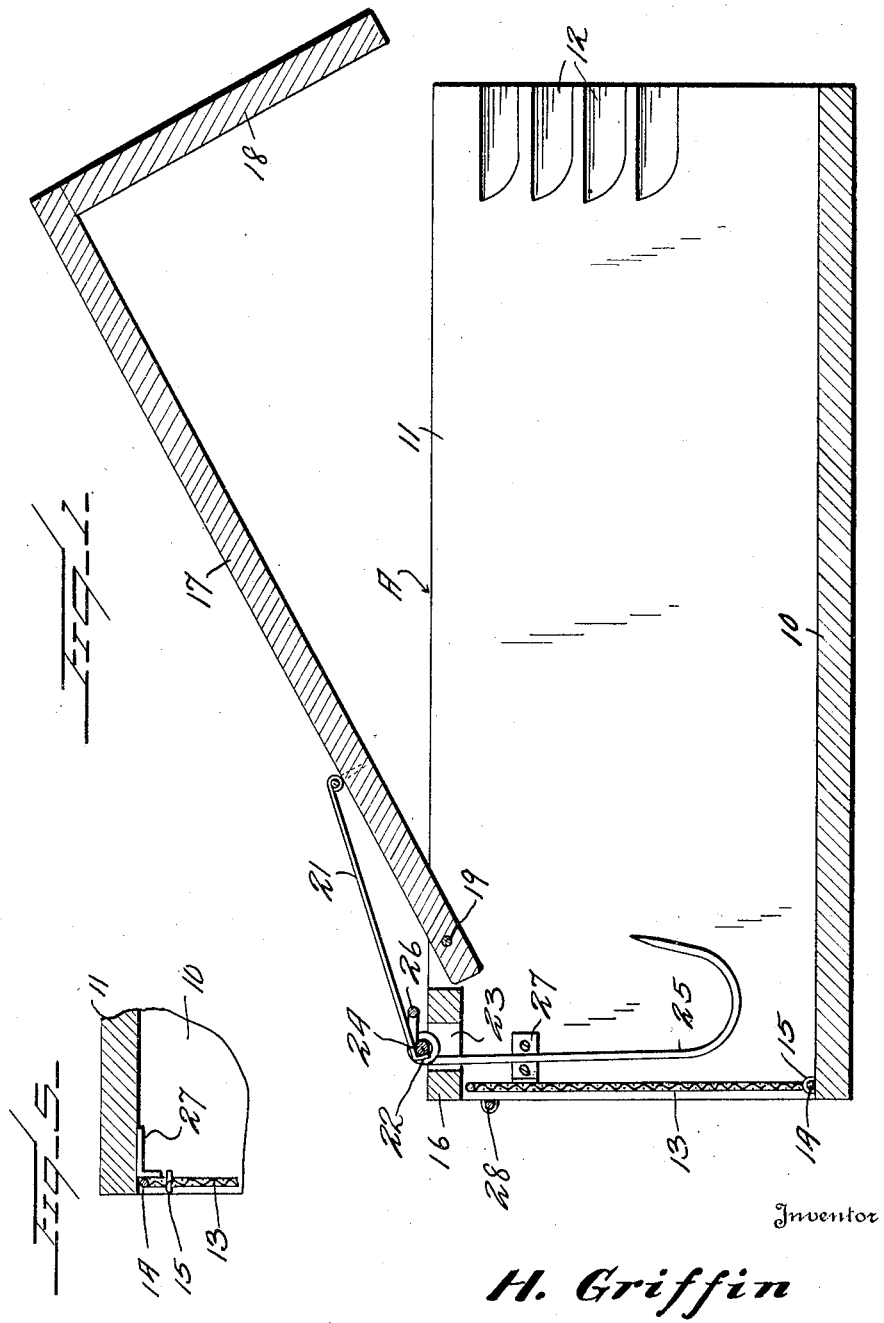
Inventor
H. Griffin
By Watson E. Coleman
Attorney Nov. 8, 1927. 1,648,765
H. GRIFFIN
ANIMAL TRAP
Filed Feb. 26, 1927 2 Sheets-Sheet 2
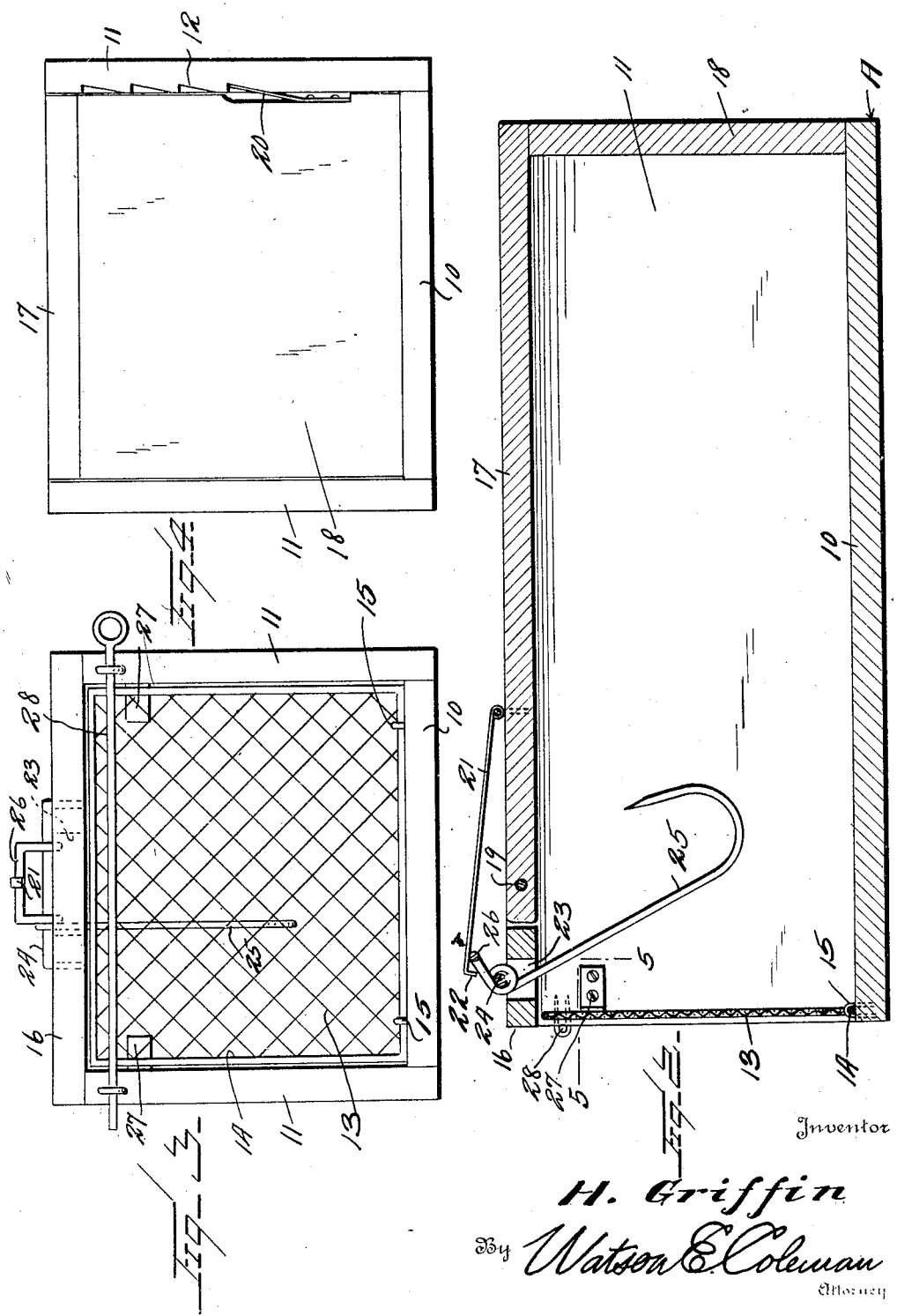

Patented Nov. 8, 1927.

1,648,765

UNITED STATES PATENT OFFICE.

HARRY GRIFFIN, OF WEST BRANCH, MICHIGAN.

ANIMAL TRAP.

Application filed February 26, 1927. Serial No. 171,248.

This invention relates to traps and particularly to traps used for catching rats, muskrats, rabbits, and other animals of this nature.

The general object of the present invention is to provide a trap which when set shall be as open as possible so as not to deter animals from entering the trap and another object is to provide a trap which is very simple in its character and which includes a top wall and an end wall, raised when the trap is set but swinging to a closed position when the trap is sprung and which is so constructed as to absolutely prevent an animal from opening the trap after the trap has been sprung.

A further object is to provide a trap having an openwork end wall in the form of a door which may be opened to permit the animal to be removed from the trap.

Other objects will appear in the course of the following description.

My invention is illustrated in the accompanying drawings wherein:—

Figure 1 is a section of the device in set position;

Fig. 2 is a similar view showing the trap closed;

Fig. 3 is an end view of the same;

Fig. 4 is a view from the opposite end;

Fig. 5 is a detailed sectional view on the line 5—5 of Figure 2.

Referring to these drawings A designates the body of the trap which consists of the floor 10 and the two side walls 11. One of these side walls is provided at one end with a series of ratchet notches 12. Hingedly mounted upon the floor 10 at the opposite end of the body of the trap is a closure or door designated generally 13 formed of an outer frame 14 and a web of wire netting or like material. This frame 14 is hingedly connected to the floor by the staples 15. At one end the side walls 11 support a cross bar 16 and forward of this cross bar there is disposed the top wall or lid 17 which carries upon it an end wall 18. The lid 17 is pivoted upon a transverse pivotal axis 19. The end wall 18 carries upon it the pawl or ratchet 20 which is engageable with the ratchet notches 12 when the lid has been dropped to prevent the raising of the lid.

Pivotally engaged with the outer face of the lid 17 is a detent 21 whose free end is slightly hook-shaped as at 22. The part 16 is formed at its middle with an opening or recess 23 across which extends a cross bar 24. Mounted upon the cross bar is a trigger having a depending hook-shaped shank 25 upon which the bait is supported. This trigger is made of heavy wire which is bent to form two eyes embracing the cross bar 24 and a loop 26. The walls 11 are provided with stops 27 limiting the inward movement of the door 13 and this door is held against accidental outward movement by means of the transverse pin 28 extending through openings in the side walls and removable to permit the outward movement of the door.

In the use of this device, in setting the trap, bait is placed upon the bait hook 25 and the lid or top 17 with its attached wall 18 raised. The hook-shaped end of the detent is engaged with the cross bar 24 upon which the trigger is mounted and extends over the looped portion 26 of the trigger. If now an animal enters the trap and attacks the bait he will pull upon the bait and attempt to draw it toward the main opening of the trap and in doing so will swing the bait hook 25 forward and the looped portion 26 upward which will detach the detent 21 from its engagement with the cross bar 24 whereupon the lid and the wall 18 will immediately fall under its own weight. As soon as the wall 18 has nearly closed, the pawl or latch 20 will prevent any opening movement of the lid so that the lid need not be fully closed in order to trap the animal. This trap was particularly designed and used for trapping muskrats and has been found extremely effective for the purpose because of the quickness with which the lid drops when released but particularly because of the fact that when the lid is raised the interior of the trap is fully illuminated and is light and bright so that animals do not feel the same fear in entering the trap that they do in entering an ordinary trap as, for instance, a trap having merely a sliding door at one end which is tripped when the animal takes the bait. The trap, of course, will be made of various sizes depending upon the nimals for which it is to be used and I do not wish to be limited to the proportions shown. Neither do I wish to be limited to the exact details as it is obvious many changes might be made therein without departing from the spirit of the invention as defined in the appended claims.

I claim:—

1. A trap of the character described comprising a body formed of a bottom and two side walls, a gate mounted at one end of the body, means for locking the gate in a closed position, a lid pivotally mounted upon the side walls adjacent the gate and carrying at its opposite end an end wall adapted to fit between the ends of the side walls, a bait hook swingingly mounted upon the body adjacent the gate and between the gate and the lid and including a looped portion, and a detent pivotally mounted upon the lid and having a hooked end adapted to extend over the looped portion and operatively engage the body to hold the lid raised, swinging of the bait hook acting to raise the hooked portion and detach the detent from its engagement to thereby permit the dropping of the lid and end wall.

2. A trap comprising a body formed of a bottom and side walls, a gate hingedly mounted upon the body at one end thereof, means for holding the gate closed, a transversely extending section mounted upon the side walls of the body adjacent the gate and having a slot in its middle, a cross bar extending across said slot, a lid pivotally engaged with the side walls adjacent said transverse section and at its opposite end having an end wall adapted, when the lid is lowered, to close the corresponding end of the body, a detent pivoted upon the face of the lid and having a hooked extremity adapted to engage said cross bar, and a bait hook pivotally swung upon the cross bar and disposed adjacent the gate, the bait hook having a U-shaped portion normally extending horizontally and beneath the detent when the latter is engaged with the cross bar.

3. A trap comprising a body formed of a bottom and side walls, a gate mounted upon the body at one end thereof, means for holding the gate closed, a transversely extending section mounted upon the side walls of the body adjacent the gate and having a slot in its middle, a cross bar extending across said slot, a lid pivotally engaged with the side walls adjacent said transverse section and at its opposite end having an end wall adapted, when the lid is lowered, to close the corresponding end of the body, a detent pivoted upon the face of the lid and having a hooked extremity adapted to engage said cross bar, and a bait hook pivotally swung upon the cross bar and disposed adjacent the gate, the bait hook having a U-shaped portion normally extending horizontally and beneath the detent when the latter is engaged with the cross bar, and means for automatically latching the lid in a lowered position.

In testimony whereof I hereunto affix my signature.

HARRY GRIFFIN.